(12) United States Patent
Yang et al.

(10) Patent No.: US 12,221,564 B2
(45) Date of Patent: Feb. 11, 2025

(54) BONDING COMPOSITION AND METHOD THEREOF

(71) Applicant: Unipros Camping Products Company Limited, Xiamen (CN)

(72) Inventors: Yonggeng Yang, Xiamen (CN); Shenglong Wang, Xiamen (CN); Lijun Song, Xiamen (CN); Yincai Wu, Xiamen (CN)

(73) Assignee: Unipros Camping Products Company Limited, Xiamen (CN)

( * ) Notice: Subject to any disclaimer, the term of this patent is extended or adjusted under 35 U.S.C. 154(b) by 257 days.

(21) Appl. No.: 17/975,081

(22) Filed: Oct. 27, 2022

(65) Prior Publication Data

US 2023/0392058 A1    Dec. 7, 2023

(30) Foreign Application Priority Data

Jun. 2, 2022   (CN) .......................... 202210627265.9

(51) Int. Cl.
| | | |
|---|---|---|
| *C09J 175/04* | (2006.01) | |
| *C09J 7/38* | (2018.01) | |
| *C09J 7/40* | (2018.01) | |
| *C09J 11/04* | (2006.01) | |
| *C09J 11/06* | (2006.01) | |

(52) U.S. Cl.
CPC ............. *C09J 175/04* (2013.01); *C09J 7/381* (2018.01); *C09J 7/403* (2018.01); *C09J 11/04* (2013.01); *C09J 11/06* (2013.01)

(58) Field of Classification Search
CPC ... C09J 11/06; C09J 11/04; C09J 7/403; C09J 7/381; C09J 175/04
See application file for complete search history.

(56) References Cited

U.S. PATENT DOCUMENTS

| | | | | |
|---|---|---|---|---|
| 6,866,928 B2 * | 3/2005 | Narum | ....................... | C09J 7/22 |
| | | | | 428/920 |
| 2004/0241410 A1 * | 12/2004 | Fischer | ...................... | C09J 7/35 |
| | | | | 428/292.1 |

FOREIGN PATENT DOCUMENTS

| | | |
|---|---|---|
| CN | 1519094 A | 8/2004 |
| CN | 107603556 A | 1/2018 |

\* cited by examiner

*Primary Examiner* — Vishal I Patel
(74) *Attorney, Agent, or Firm* — Cooper Legal Group, LLC

(57) ABSTRACT

The bonding composition comprises 70-85 wt % of thermoplastic polyurethane (TPU) with a melting point of 60-130° C., 6-10 wt % of compounded phosphorus-nitrogen flame retardant, 2-5 wt % of nano rare-earth oxide, 1-3 wt % of antibacterial agent, and 6-12 wt % of tackifier.

12 Claims, No Drawings

BONDING COMPOSITION AND METHOD THEREOF

RELATED APPLICATIONS

This application claims priority to Chinese patent application number 202210627265.9, filed on Jun. 2, 2022. Chinese patent application number 202210627265.9 is incorporated herein by reference.

FIELD OF THE DISCLOSURE

The present disclosure relates to the technical field of bonding materials, and specifically relates to a bonding composition and a method thereof.

BACKGROUND OF THE DISCLOSURE

A simple process for preparing a traditional tent surface is as follows: cutting fabrics, lapping fabrics to be stitched using needles and threads, and bonding waterproof tape to stitching positions using heat sealing at a single side. As known from the process, three steps and two machines (a sewing machine and a heat sealing machine) are involved, and space and personnel are required for operating these devices. As labor costs increase, burdens on the enterprises increase following a decline of human population in China. Therefore, the process for preparing the traditional tent changes by pushing the envelope. Manpower is reduced and labor costs are saved, which becomes an important direction of technology development in tent enterprises.

For example, binding tape materials are introduced using a heat bonding method instead the lapping and the stitching using needles, and then the waterproof tape are bonded using the heat sealing, such that the two steps are combined into one step. Not only is the number of machines is reduced, but the number of operators is also reduced, and a purpose of the technology development and cost optimization is achieved.

Chinese patent application CN1519094A discloses a method for preparing polyurethane-Teflon composite stretched film. The technical solution is as follows: dissolving thermoplastic polyurethane to prepare a polyurethane solution with a certain concentration using a solvent, and then coating on a Teflon-base tape, and then immersing the base tape in water or drying the base tape at 70-160° C. The film can be used for bonding thermal underwear, sportswear, and tents. Chinese patent application CN107603556A discloses a method for preparing hot-melt bonding for tents. The method is as follows: mixing dimer acid and benzene, boiling for 8-12 minutes by heating, then adding anhydrous magnesium sulfate to obtain anhydrous dimer acid, then adding caprolactam, isophorone diamine, sodium phytate, hexamethyldisilylamine, and concentrated sulfuric acid, and maintaining temperature and pressure at 230-240° C. for 160-200 minutes to obtain the bonding. The bonding has strong bonding strength for the tents and can prolong a service life of the tents.

As known from the aforementioned patents, the bonding composition for the tents all have organic solvents, some of which even include benzene, which is a carcinogenic substance, has poor environmental friendliness, and does not meet the requirements of an operation in a closed space.

BRIEF SUMMARY OF THE DISCLOSURE

An objective of the present disclosure is to provide a bonding composition for anti-aging and antibacterial tent fabrics to solve deficiencies of the existing techniques.

Another objective of the present disclosure is to provide a method for preparing the bonding composition for the anti-aging and antibacterial tent fabrics.

The technical solution of the present disclosure is as follows.

A bonding composition, comprising: 70-85 wt % of thermoplastic polyurethane (TPU) with a melting point of 60-130° C., 6-10 wt % of compounded phosphorus-nitrogen flame retardant, 2-5 wt % of nano rare-earth oxide, 1-3 wt % of antibacterial agent, and 6-12 wt % of tackifier, wherein the TPU is a polymer of methylenediphenyl diisocyanate (MDI) and at least one of polyester polyol or polyether polyol, the compounded phosphorus-nitrogen flame retardant comprises aluminum diethylhypophosphite and melamine polyphosphate, the nano rare-earth oxide is nano cerium oxide or nano lanthanum oxide, and the tackifier is at least one of acrylate polymer or epoxy acrylate polymer.

In a preferred embodiment of the present disclosure, the antibacterial agent comprises at least two of zinc pyrithione, copper pyrithione, 5-chloro-2-methyl-4-isothiazolin-3-one, or 2-methyl-4-isothiazolin-3-one.

In a preferred embodiment of the present disclosure, the antibacterial agent comprises two of zinc pyrithione, copper pyrithione, 5-chloro-2-methyl-4-isothiazolin-3-one, 2-methyl-4-isothiazolin-3-one, or rare-earth pyrithione in a weight ratio of 0.8-1.2:08-1.2.

In a preferred embodiment of the present disclosure, the rare-earth pyrithione comprises at least one of cerium pyrithione, lanthanum pyrithione, or Europium pyrithione.

In a preferred embodiment of the present disclosure, the melting point of the TPU is 70-110° C.

In a preferred embodiment of the present disclosure, the compounded phosphorus-nitrogen flame retardant is compounded from aluminum diethylhypophosphite and melamine polyphosphate in a weight ratio of 1-1.5:0.8-1.2.

In a preferred embodiment of the present disclosure, a molecular weight of the acrylate polymer is 60,000-64,000, and a molecular weight of the epoxy acrylate polymer is 50,000-53,000.

In a preferred embodiment of the present disclosure, the TPU with the melting point of 70° C. is 85 wt %, the compounded phosphorus-nitrogen flame retardant is 6 wt %, the nano rare-earth oxide is 2 wt %, the antibacterial agent is 1 wt %, the tackifier is 6 wt %, the nano rare-earth oxide is the nano lanthanum oxide, the tackifier is the acrylate polymer with a molecular weight of 63,000, and the antibacterial agent comprises zinc pyrithione and 5-chloro-2-methyl-4-isothiazolin-3-one in a weight ratio of 1:1.

In a preferred embodiment of the present disclosure, the TPU with the melting point of 90° C. is 78 wt %, the compounded phosphorus-nitrogen flame retardant is 8 wt %, the nano rare-earth oxide is 3 wt %, the antibacterial agent is 2 wt %, the tackifier is 9 wt %, the nano rare-earth oxide is the nano cerium oxide, the tackifier is the epoxy acrylate polymer with a molecular weight of 52,000, and the antibacterial agent comprises zinc pyrithione and copper pyrithione in a weight ratio of 1:1.

In a preferred embodiment of the present disclosure, the TPU with the melting point of 110° C. is 70 wt %, the compounded phosphorus-nitrogen flame retardant is 10 wt %, the nano rare-earth oxide is 5 wt %, the antibacterial agent is 3 wt %, the tackifier is 12 wt %, the nano rare-earth oxide is the nano cerium oxide, the tackifier is the epoxy acrylate polymer with a molecular weight of 52,000 and the acrylate polymer with a molecular weight of 63,000 in a weight ratio of 1:1, and the antibacterial agent comprises zinc pyrithione and copper pyrithione in a weight ratio of 1:1.

A method for preparing the bonding composition, comprising:
1. (1) dispersing the TPU and the tackifier at a stirring speed of 300-500 revolutions per minute (rpm) for 20-30 minutes to be mixed to be uniform to obtain a first material;
2. (2) pouring the first material obtained in step (1) into a feed tank of a twin-screw extruder;
3. (3) stirring the compounded phosphorus-nitrogen flame retardant, the nano rare-earth oxide, and the antibacterial agent to be mixed to be uniform, and then pouring the compounded phosphorus-nitrogen flame retardant, the nano rare-earth oxide, and the antibacterial agent into the feed tank of the twin-screw extruder to obtain a second material;
4. (4) mixing the first material and the second material obtained in steps (1) and (3) to be uniform using the twin-screw extruder, cooling using water for cooling, granulating, and drying to control a moisture content to be less than 0.03% to obtain material particles;
5. (5) introducing the material particles obtained in step (4) into a feed port of a cast machine, casting onto a surface with release paper of a cast roll to form a film, applying pressure to the film to enable the film to be flatly attached to the release paper, moving the film with the cast roll to pass through a cooling device, and then shaping the film to obtain a cast film coil; and
6. (6) cutting the cast film coil obtained in step (5) into tape and storing in a vacuum-sealed plastic bag.

In a preferred embodiment of the present disclosure, a temperature for the drying is 70-90° C.

In a preferred embodiment of the present disclosure, the antibacterial agent is a compounded antibacterial agent.

The present disclosure has the following advantages.
1. The present disclosure provides a solid tape-like modified TPU bonding material, mainly comprises TPU, compounded phosphorus-nitrogen flame-retardant, nano rare-earth oxide, tackifier, and antibacterial agent. The solid tape-like modified TPU bonding material has advantages of being flame retardant, ultraviolet-aging (UV-aging) resistance, being waterproof, having high bonding strength, being environmentally friendly, being antibacterial, etc. The solid tape-like modified TPU bonding material fully meets requirements of new technology and new method for manufacturing tents.
2. The preparation method of the present disclosure is convenient and environmentally friendly, and the preparation method can be applied to tents, clothing, shoes, and other materials.

DETAILED DESCRIPTION OF THE EMBODIMENTS

The present disclosure will be further described below with the accompanying embodiments.

Embodiment 1

(1) Thermoplastic Polyurethane (TPU) with a melting point of 70° C. (product No. 1070AP, which is purchased from Zhejiang Huafon Thermoplastic Polyurethane Co., Ltd.) and a tackifier of acrylate polymer (a molecular weight is 63000) are added into a mixing tank according to the following ratio, stirred at a constant speed, and dispersed at a stirring speed of 500 revolutions/minute for 20 minutes to be uniformly mixed for later use. The TPU is a polymer of polyester polyol, polyether polyol, and methylenediphenyl diisocyanate (MDI).

(2) The material obtained in the step (1) is poured into a feed tank of a twin-screw extruder.

(3) Flame retardant (e.g., a compounded phosphorus-nitrogen flame retardant), nano lanthanum oxide, an antibacterial agent (e.g., a compounded antibacterial agent), etc. are added into the mixing tank according to a ratio, uniformly mixed, and then poured into the feed tank of the twin-screw extruder. The compounded phosphorus-nitrogen flame retardant is compounded using aluminum diethylhypophosphite and melamine polyphosphate.

(4) An extrusion temperature and a discharge rate are set, the materials obtained in the steps (2) and (3) are uniformly mixed using the twin-screw extruder, cooled by water for cooling, granulated, and then put into a constant-temperature oven a while later, and dried to control a moisture content to be less than 0.03% to obtain material particles, wherein a drying temperature is set to 80° C.

(5) The material particles obtained in the step (4) are introduced into a feed port of a cast machine, cast onto a surface with release paper of a cast roll to form a film, a pressure is applied to the film to enable the film to be flatly attached to the release paper, so that the film moves with the cast roll to pass through a cooling device, and then the film is shaped to obtain cast film coils.

(6) The cast film coils obtained in the step (5) are cut into tape for fixing requirements and stored in vacuum-sealed plastic bags.

The following tables illustrate a ratio of main components of the tape in this embodiment.

TABLE 1

Ratio of the main components in Embodiment 1

| No. | Material name | wt % |
|---|---|---|
| 1 | Thermoplastic polyurethane (TPU) | 85 |
| 2 | Flame retardant | 6 |
| 3 | Nano ultraviolet-aging (UV-aging) resistance agent (Lanthanum oxide) | 2 |
| 4 | Zinc pyrithione (ZPT), CIT (a weight ratio is 1:1) | 1 |
| 5 | tackifier (acrylate polymer) | 6 |

TABLE 2

Performance of a bonding tent of Embodiment 1

| No. | Items | Set value for test | Implement standard |
|---|---|---|---|
| 1 | Bonding strength, N | 280 | ISO 13935-2-2014 |
| 2 | Flame retardant grade | V-0 | UL 90 |
| 3 | UV-aging resistance (no unglued phenomenon, no chalking), 12 months | Pass | Outdoor test |
| 4 | A size of a bacterial inhibition zone (an inhibition rate of E. coli) | 22 mm | — |

Embodiment 2

(1) Thermoplastic Polyurethane (TPU) with a melting point of about 90° C. (product No. 1180A, which is purchased from BASF) and a tackifier of epoxy acrylate polymer (a molecular weight is 52000) are added into a mixing tank according to the following ratio, stirred at a constant speed, and dispersed at a stirring speed of 300 revolutions/minute for 30 minutes to be uniformly mixed for later use. The TPU is a polymer of polyester polyol, polyether polyol, and methylenediphenyl diisocyanate (MDI).

(2) The material obtained in the step (1) is poured into a feed tank of a twin-screw extruder.

(3) Flame retardant (e.g., a compounded phosphorus-nitrogen flame retardant), nano cerium oxide, an antibacterial agent (e.g., a compounded antibacterial agent), etc. are added into the mixing tank according to a ratio, uniformly mixed, and then poured into the feed tank of the twin-screw extruder. The compounded phosphorus-nitrogen flame retardant is compounded using aluminum diethylhypophosphite and melamine polyphosphate.

(4) An extrusion temperature and a discharge rate are set, the materials obtained in the steps (2) and (3) are uniformly mixed using the twin-screw extruder, cooled by water for cooling, granulated, and then put into a constant-temperature oven a while later, and dried to control a moisture content to be less than 0.03% to obtain material particles, wherein a drying temperature is set to 70° C.

(5) The material particles obtained in the step (4) are introduced into a feed port of a cast machine, cast onto a surface with release paper of a cast roll to form a film, a pressure is applied to the film to enable the film to be flatly attached to the release paper, so that the film moves with the cast roll to pass through a cooling device, and then the film is shaped to obtain cast film coils.

(6) The cast film coils obtained in the step (5) are cut into tape for fixing requirements and stored in vacuum-sealed plastic bags.

The following tables illustrate a ratio of main components of the tape in this embodiment.

TABLE 3

Ratio of the main components in Embodiment 2

| No. | Material name | wt % |
|---|---|---|
| 1 | Thermoplastic polyurethane (TPU) | 78 |
| 2 | Flame retardant | 8 |
| 3 | Nano UV-aging resistance agent (cerium oxide) | 3 |
| 4 | CPT, ZPT (a weight ratio is 1:1) | 2 |
| 5 | tackifier (epoxy acrylate polymer) | 9 |

TABLE 4

Performance of a bonding tent of Embodiment 2

| No. | Items | Set value for test | Implement standard |
|---|---|---|---|
| 1 | Bonding strength, N | 350 | ISO 13935-2-2014 |
| 2 | Flame retardant grade | V-0 | UL 90 |
| 3 | UV-aging resistance (no unglued phenomenon, no chalking), 12 months | Pass | Outdoor test |
| 4 | A size of a bacterial inhibition zone (an inhibition rate of *E. coli*) | 28 mm | — |

Embodiment 3

(1) Thermoplastic Polyurethane (TPU) with a melting point of 110° C. (product No. 1195A, which is purchased from BASF) and a mixture tackifier of acrylate polymer (a molecular weight is 63000) and epoxy acrylate polymer (a molecular weight is 52000) (a weight ratio of the acrylate polymer and the epoxy acrylate polymer is 1:1) are added into a mixing tank according to the following ratio, stirred at a constant speed, and dispersed at a stirring speed of 400 revolutions/minute for 25 minutes to be uniformly mixed for later use. The TPU is a polymer of polyester polyol, polyether polyol, and methylenediphenyl diisocyanate (MDI).

(2) The material obtained in the step (1) is poured into a feed tank of a twin-screw extruder.

(3) Flame retardant (e.g., a compounded phosphorus-nitrogen flame retardant), nano cerium oxide, an antibacterial agent (e.g., a compounded antibacterial agent), etc. are added into the mixing tank according to a ratio, uniformly mixed, and then poured into the feed tank of the twin-screw extruder. The compounded phosphorus-nitrogen flame retardant is compounded using aluminum diethylhypophosphite and melamine polyphosphate.

(4) An extrusion temperature and a discharge rate are set, the materials obtained in the steps (2) and (3) are uniformly mixed using the twin-screw extruder, cooled by water for cooling, granulated, and then put into a constant-temperature oven a while later, and dried to control a moisture content to be less than 0.03% to obtain material particles, wherein a drying temperature is set to 90° C.

(5) The material particles obtained in the step (4) are introduced into a feed port of a cast machine, cast onto a surface with release paper of a cast roll to form a film, a pressure is applied to the film to enable the film to be flatly attached to the release paper, so that the film moves with the cast roll to pass through a cooling device, and then the film is shaped to obtain cast film coils.

(6) The cast film coils obtained in the step (5) are cut into tape for fixing requirements and stored in vacuum-sealed plastic bags.

The following tables illustrate a ratio of main components of the tape in this embodiment.

TABLE 5

Ratio of the main components in Embodiment 3

| No. | Material name | wt % |
|---|---|---|
| 1 | Thermoplastic polyurethane (TPU) | 70 |
| 2 | Flame retardant | 10 |
| 3 | Nano UV-aging resistance agent (cerium oxide) | 5 |
| 4 | MIT, ZPT (a weight ratio is 1:1) | 3 |
| 5 | Mixture tackifier | 12 |

TABLE 6

Performance of a bonding tent of Embodiment 3

| No. | Items | Set value for test | Implement standard |
|---|---|---|---|
| 1 | Bonding strength, N | 220 | ISO 13935-2-2014 |
| 2 | Flame retardant grade | V-0 | UL 90 |
| 3 | UV-aging resistance (no unglued phenomenon, no chalking), 12 months | Pass | Outdoor test |
| 4 | A size of a bacterial inhibition zone (an inhibition rate of *E. coli*) | 22 mm | — |

Comparative Embodiment 4

(1) Thermoplastic Polyurethane (TPU) with a melting point of 90° C. (product No. 1180A, which is purchased from BASF) and a tackifier of epoxy acrylate polymer (a molecular weight is 52000) are added into a mixing tank according to the following ratio, stirred at a constant speed, and dispersed at a stirring speed of 300 revolutions/minute for 30 minutes to be uniformly mixed for later use. The TPU is a polymer of polyester polyol, polyether polyol, and methylenediphenyl diisocyanate (MDI).

(2) The material obtained in the step (1) is poured into a feed tank of a twin-screw extruder.

(3) Flame retardant (e.g., a compounded phosphorus-nitrogen flame retardant), nano cerium oxide, an antibacterial agent (e.g., a compounded antibacterial agent), etc. are added into the mixing tank according to a ratio, uniformly mixed, and then poured into the feed tank of the twin-screw extruder. The compounded phosphorus-nitrogen flame retardant is compounded using aluminum diethylhypophosphite and melamine polyphosphate.

(4) An extrusion temperature and a discharge rate are set, the materials obtained in the steps (2) and (3) are uniformly mixed using the twin-screw extruder, cooled by water for cooling, granulated, and then put into a constant-temperature oven a while later, and dried to control a moisture content to be less than 0.03% to obtain material particles, wherein a drying temperature is 70° C.

(5) The material particles obtained in the step (4) are introduced into a feed port of a cast machine, cast onto a surface with release paper of a cast roll to form a film, a pressure is applied to the film to enable the film to be flatly attached to the release paper, so that the film moves with the cast roll to pass through a cooling device, and then the film is shaped to obtain cast film coils.

(6) The cast film coils obtained in the step (5) are cut into tape for fixing requirements and stored in vacuum-sealed plastic bags.

The following tables illustrate a ratio of main components of the tapes in this comparative embodiment.

TABLE 7

Ratio of the main components in Comparative Embodiment 4

| No. | Material name | wt % |
|---|---|---|
| 1 | Thermoplastic polyurethane (TPU) | 87 |
| 2 | Flame retardant | 8 |
| 3 | Nano UV-aging resistance agent (cerium oxide) | 3 |
| 4 | CPT, ZPT (a weight ratio is 1:1) | 2 |
| 5 | tackifier (epoxy acrylate polymer) | 0 |

TABLE 8

Performance of a bonding tent of Comparative Embodiment 4

| No. | Items | Set value for test | Implement standard |
|---|---|---|---|
| 1 | Bonding strength, N | 120 | ISO 13935-2-2014 |
| 2 | Flame retardant grade | V-0 | UL 90 |
| 3 | UV-aging resistance (no unglued phenomenon, no chalking), 10 months | Pass | Outdoor test |
| 4 | A size of a bacterial inhibition zone (an inhibition rate of E. coli) | 22 mm | — |

Comparative Embodiment 5

(1) Thermoplastic Polyurethane (TPU) with a melting point of 90° C. (product No. 1180A, which is purchased from BASF) and a tackifier of epoxy acrylate polymer (a molecular weight is 52000) are added into a mixing tank according to the following ratio, stirred at a constant speed, and dispersed at a stirring speed of 300 revolutions/minute for 30 minutes to be uniformly mixed for later use. The TPU is a polymer of polyester polyol, polyether polyol, and methylenediphenyl diisocyanate (MDI).

(2) The material obtained in the step (1) is poured into a feed tank of a twin-screw extruder.

(3) Flame retardant (e.g., a compounded phosphorus-nitrogen flame retardant), nano cerium oxide, an antibacterial agent (e.g., a compounded antibacterial agent), etc. are added into the mixing tank according to a ratio, uniformly mixed, and then poured into the feed tank of the twin-screw extruder. The compounded phosphorus-nitrogen flame retardant is compounded using aluminum diethylhypophosphite and melamine polyphosphate.

(4) An extrusion temperature and a discharge rate are set, the materials obtained in the steps (2) and (3) are uniformly mixed using the twin-screw extruder, cooled by water for cooling, granulated, and then put into a constant-temperature oven a while later, and dried to control a moisture content to be less than 0.03% to obtain material particles, wherein a drying temperature is 70° C.

(5) The material particles obtained in the step (4) are introduced into a feed port of a cast machine, cast onto a surface with release paper of a cast roll to form a film, a pressure is applied to the film to enable the film to be flatly attached to the release paper, so that the film moves with the cast roll to pass through a cooling device, and then the film is shaped to obtain cast film coils.

(6) The cast film coils obtained in the step (5) are cut into tape for fixing requirements and stored in vacuum-sealed plastic bags.

The following tables illustrate a ratio of main components of the tape in this comparative embodiment.

TABLE 9

Ratio of the main components in Comparative Embodiment 5

| No. | Material name | wt % |
|---|---|---|
| 1 | Thermoplastic polyurethane (TPU) | 78 |
| 2 | Flame retardant | 0 |
| 3 | Nano UV-aging resistance agent (cerium oxide) | 3 |
| 4 | CPT, ZPT (a weight ratio is 1:1) | 2 |
| 5 | tackifier (epoxy acrylate polymer) | 17 |

TABLE 10

Performance of a bonding tent of Comparative Embodiment 5

| No. | Items | Set value for test | Implement standard |
|---|---|---|---|
| 1 | Bonding strength, N | 220 | ISO 13935-2-2014 |
| 2 | Flame retardant grade | V-2 | UL 90 |
| 3 | UV-aging resistance (no unglued phenomenon, no chalking), 8 months | Pass | Outdoor test |
| 4 | A size of a bacterial inhibition zone (an inhibition rate of E. coli) | 15 mm | — |

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A method for preparing a bonding composition comprising:
    70-85 wt % of thermoplastic polyurethane (TPU) with a melting point of 60-130° C.,
    6-10 wt % of compounded phosphorus-nitrogen flame retardant,
    2-5 wt % of nano rare-earth oxide,
    1-3 wt % of antibacterial agent, and
    6-12 wt % of tackifier,
    wherein the TPU is a polymer of methylenediphenyl diisocyanate (MDI) and at least one of polyester polyol or polyether polyol, the compounded phosphorus-nitrogen flame retardant comprises aluminum diethylhypophosphite and melamine polyphosphate, the nano rare-earth oxide is nano cerium oxide or nano lanthanum oxide, and the tackifier is at least one of acrylate polymer or epoxy acrylate polymer, and
    wherein the method comprises:
    (1) dispersing the TPU and the tackifier at a stirring speed of 300-500 revolutions per minute (rpm) for 20-30 minutes to be mixed to be uniform to obtain a first material;
    (2) pouring the first material obtained in step (1) into a feed tank of a twin-screw extruder;
    (3) stirring the compounded phosphorus-nitrogen flame retardant, the nano rare-earth oxide, and the antibacterial agent to be mixed to be uniform, and then pouring the compounded phosphorus-nitrogen flame retardant, the nano rare-earth oxide, and the antibacterial agent into the feed tank of the twin-screw extruder to obtain a second material;
    (4) mixing the first material and the second material obtained in steps (1) and (3) to be uniform using the twin-screw extruder, cooling using water for cooling, granulating, and drying to control a moisture content to be less than 0.03% to obtain material particles;
    (5) introducing the material particles obtained in step (4) into a feed port of a cast machine, casting onto a surface with release paper of a cast roll to form a film, applying pressure to the film to enable the film to be flatly attached to the release paper, moving the film with the cast roll to pass through a cooling device, and then shaping the film to obtain a cast film coil; and
    (6) cutting the cast film coil obtained in step (5) into tape and storing in a vacuum-sealed plastic bag.

2. The method according to claim 1, wherein a temperature for the drying is 70-90° C.

3. The method according to claim 1, wherein the antibacterial agent is a compounded antibacterial agent.

4. The method according to claim 1, wherein the antibacterial agent comprises at least two of zinc pyrithione, copper pyrithione, 5-chloro-2-methyl-4-isothiazolin-3-one, or 2-methyl-4-isothiazolin-3-one.

5. The method according to claim 4, wherein the antibacterial agent comprises two of zinc pyrithione, copper pyrithione, 5-chloro-2-methyl-4-isothiazolin-3-one, 2-methyl-4-isothiazolin-3-one, or rare-earth pyrithione in a weight ratio of 0.8-1.2:08-1.2.

6. The method according to claim 1, wherein the melting point of the TPU is 70-110° C.

7. The method according to claim 1, wherein the compounded phosphorus-nitrogen flame retardant is compounded from aluminum diethylhypophosphite and melamine polyphosphate in a weight ratio of 1-1.5:0.8-1.2.

8. The method according to claim 1, wherein:
    a molecular weight of the acrylate polymer is 60,000-64,000, and
    a molecular weight of the epoxy acrylate polymer is 50,000-53,000.

9. The method according to claim 1, wherein:
    the TPU with the melting point of 70° C. is 85 wt %,
    the compounded phosphorus-nitrogen flame retardant is 6 wt %,
    the nano rare-earth oxide is 2 wt %,
    the antibacterial agent is 1 wt %,
    the tackifier is 6 wt %,
    the nano rare-earth oxide is the nano lanthanum oxide,
    the tackifier is the acrylate polymer with a molecular weight of 63,000, and
    the antibacterial agent comprises zinc pyrithione and 5-chloro-2-methyl-4-isothiazolin-3-one in a weight ratio of 1:1.

10. The method according to claim 1, wherein:
    the TPU with the melting point of 90° C. is 78 wt %,
    the compounded phosphorus-nitrogen flame retardant is 8 wt %,
    the nano rare-earth oxide is 3 wt %,
    the antibacterial agent is 2 wt %,
    the tackifier is 9 wt %,
    the nano rare-earth oxide is the nano cerium oxide,
    the tackifier is the epoxy acrylate polymer with a molecular weight of 52,000, and
    the antibacterial agent comprises zinc pyrithione and copper pyrithione in a weight ratio of 1:1.

11. The method according to claim 5, wherein the rare-earth pyrithione comprises at least one of cerium pyrithione, lanthanum pyrithione, or Europium pyrithione.

12. The method according to claim 1, wherein:
    the TPU with the melting point of 110° C. is 70 wt %,
    the compounded phosphorus-nitrogen flame retardant is 10 wt %,
    the nano rare-earth oxide is 5 wt %,
    the antibacterial agent is 3 wt %,
    the tackifier is 12 wt %,
    the nano rare-earth oxide is the nano cerium oxide,
    the tackifier is the epoxy acrylate polymer with a molecular weight of 52,000 and the acrylate polymer with a molecular weight of 63,000 in a weight ratio of 1:1, and
    the antibacterial agent comprises zinc pyrithione and copper pyrithione in a weight ratio of 1:1.

\* \* \* \* \*